(12) United States Patent
Kwon et al.

(10) Patent No.: US 11,773,462 B2
(45) Date of Patent: Oct. 3, 2023

(54) ANNEALING SEPARATOR COMPOSITION FOR GRAIN-ORIENTED ELECTRICAL STEEL SHEET, GRAIN-ORIENTED ELECTRICAL STEEL SHEET, AND METHOD FOR PRODUCING GRAIN-ORIENTED ELECTRICAL STEEL SHEET

(71) Applicant: POSCO, Pohang-si (KR)

(72) Inventors: Min Serk Kwon, Pohang-si (KR); Chang Soo Park, Pohang-si (KR); Heon-Jo Choi, Pohang-si (KR); Se-Min Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 879 days.

(21) Appl. No.: 16/472,247

(22) PCT Filed: Dec. 21, 2017

(86) PCT No.: PCT/KR2017/015205
§ 371 (c)(1),
(2) Date: Jun. 21, 2019

(87) PCT Pub. No.: WO2018/117673
PCT Pub. Date: Jun. 28, 2018

(65) Prior Publication Data
US 2019/0323104 A1 Oct. 24, 2019

(30) Foreign Application Priority Data

Dec. 22, 2016 (KR) .......................... 10-2016-0177070

(51) Int. Cl.
*C04B 35/04* (2006.01)
*C04B 35/185* (2006.01)
*C21D 9/46* (2006.01)
*C04B 35/622* (2006.01)
*C04B 35/64* (2006.01)
*C21D 1/68* (2006.01)
*C21D 6/00* (2006.01)
*C21D 8/00* (2006.01)
*C21D 8/12* (2006.01)
*C22C 38/00* (2006.01)
*C22C 38/02* (2006.01)
*C22C 38/04* (2006.01)
*C22C 38/06* (2006.01)
*C22C 38/08* (2006.01)

(52) U.S. Cl.
CPC .............. *C21D 9/46* (2013.01); *C04B 35/185* (2013.01); *C04B 35/62222* (2013.01); *C04B 35/64* (2013.01); *C21D 1/68* (2013.01); *C21D 6/001* (2013.01); *C21D 6/005* (2013.01); *C21D 6/008* (2013.01); *C21D 8/005* (2013.01); *C21D 8/1272* (2013.01); *C22C 38/001* (2013.01); *C22C 38/008* (2013.01); *C22C 38/02* (2013.01); *C22C 38/04* (2013.01); *C22C 38/06* (2013.01); *C22C 38/08* (2013.01); *C04B 2235/3206* (2013.01); *C04B 2235/3232* (2013.01); *C04B 2235/3262* (2013.01); *C04B 2235/3279* (2013.01); *C04B 2235/3293* (2013.01); *C04B 2235/3294* (2013.01); *C04B 2235/3409* (2013.01); *C04B 2235/3463* (2013.01); *C04B 2235/386* (2013.01); *C04B 2235/3826* (2013.01); *C04B 2235/447* (2013.01); *C04B 2235/787* (2013.01); *C22C 2202/02* (2013.01)

(58) Field of Classification Search
CPC .......... C04B 35/185; C21D 9/46; C21D 1/68; C21D 1/70; C21D 1/72; C21D 8/1283; C08K 2003/222; C08K 2003/2227; C08K 2003/34; C08K 2003/36
See application file for complete search history.

(56) References Cited

U.S. PATENT DOCUMENTS

| 5,298,200 | A | * | 3/1994 | Kubo | C04B 35/16 264/16 |
|---|---|---|---|---|---|
| 11,168,376 | B2 | * | 11/2021 | Han | C21D 8/1272 |
| 11,174,525 | B2 | * | 11/2021 | Han | C22C 38/04 |
| 2018/0371576 | A1 | * | 12/2018 | Park | C21D 8/1261 |
| 2019/0382860 | A1 | * | 12/2019 | Han | C21D 9/46 |
| 2020/0095648 | A1 | * | 3/2020 | Han | C22C 38/02 |

(Continued)

FOREIGN PATENT DOCUMENTS

| CN | 1141348 A | 1/1997 |
|---|---|---|
| CN | 1692164 A | 11/2005 |
| CN | 1890390 A | 1/2007 |

(Continued)

OTHER PUBLICATIONS

International Search Report and Written Opinion dated Apr. 23, 2018 issued in International Patent Application No. PCT/KR2017/015205 (with partial English translation).

(Continued)

*Primary Examiner* — Karl E Group
(74) *Attorney, Agent, or Firm* — Morgan, Lewis & Bockius LLP

(57) ABSTRACT

The present invention provides an annealing separator composition, a grain-oriented electrical steel sheet and a method for manufacturing a grain-oriented electrical steel sheet.

An annealing separator composition for a grain-oriented electrical steel sheet according to an embodiment of present invention comprising: on the basis of total solid 100 wt %, 5 to 70 wt % of mullite; and the remainder being magnesium oxide or magnesium hydroxide.

1 Claim, 4 Drawing Sheets

(56) References Cited

U.S. PATENT DOCUMENTS

2022/0042125 A1 * 2/2022 Han .................. H01F 1/147

FOREIGN PATENT DOCUMENTS

| | | |
|---|---|---|
| CN | 101528950 A | 9/2009 |
| CN | 103014285 A | 4/2013 |
| CN | 103857827 A | 6/2014 |
| CN | 104024474 A | 9/2014 |
| EP | 2 940 158 A1 | 11/2015 |
| JP | 02116664 A * | 5/1990 |
| JP | 03-294465 A | 12/1991 |
| JP | H07-278827 A | 10/1995 |
| JP | H08-337823 A | 12/1996 |
| JP | 2698549 B2 | 1/1998 |
| JP | H11-061261 A | 3/1999 |
| JP | 2005-187941 A | 7/2005 |
| JP | 2014-156633 A | 8/2014 |
| JP | 2014201806 A | 10/2014 |
| KR | 0157539 B1 | 7/1998 |
| KR | 10-2003-0053796 A | 7/2003 |
| KR | 10-0503355 B1 | 7/2005 |
| KR | 10-2016-0057753 A | 5/2016 |
| WO | 2013/051270 A1 | 4/2013 |
| WO | 2014/049770 A1 | 4/2014 |
| WO | 2016085257 A1 | 6/2016 |

OTHER PUBLICATIONS

Extended European Search Report dated Oct. 14, 2019 issued in corresponding European Patent Application No. 17883023.8.

* cited by examiner

[Fig. 1]
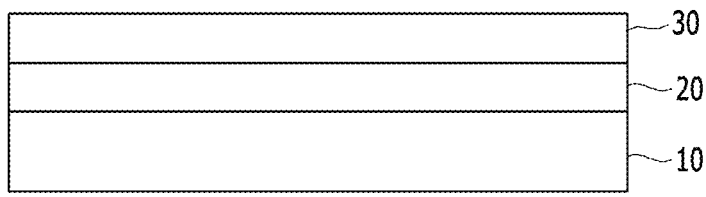

[Fig. 2]
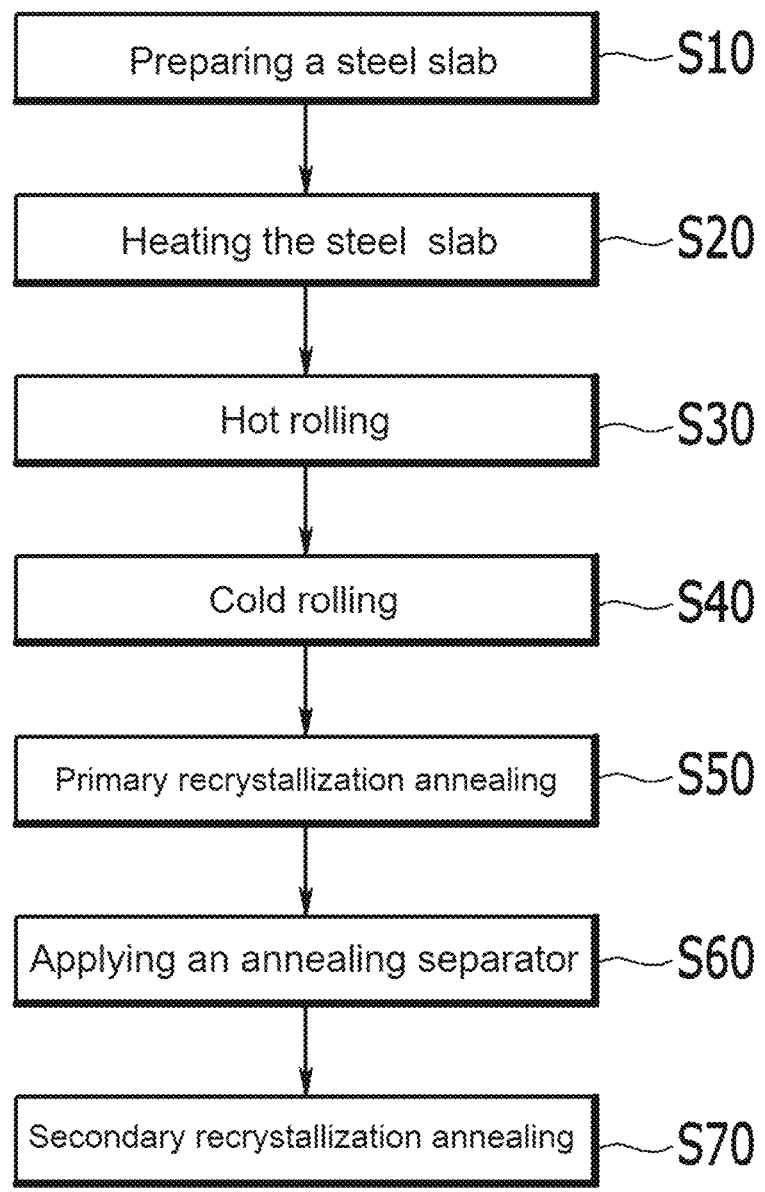

[Fig. 3]
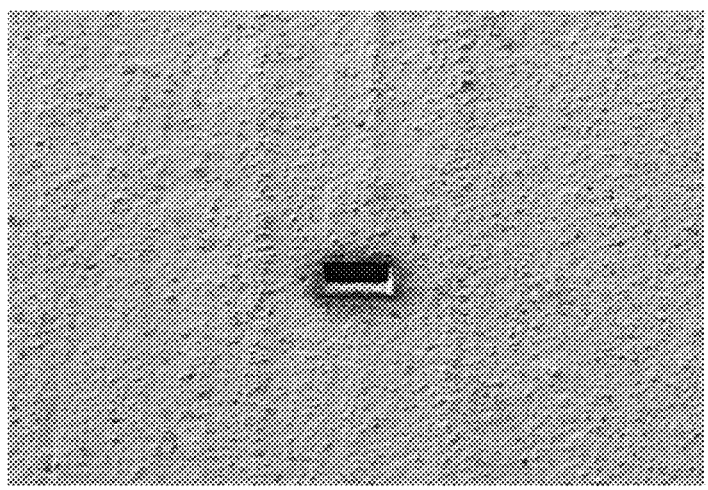
[Fig. 4]
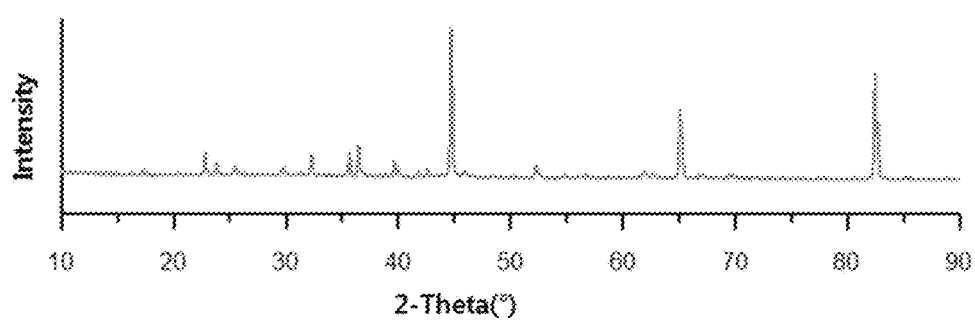

[Fig. 5]
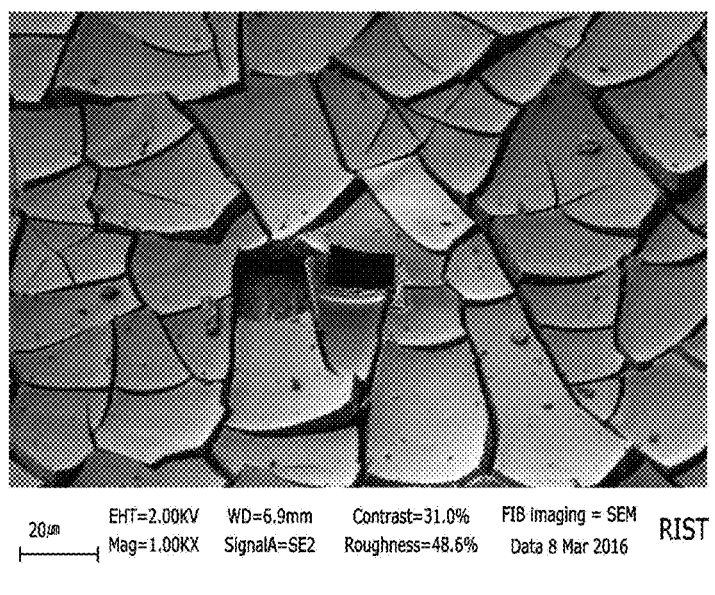

ANNEALING SEPARATOR COMPOSITION FOR GRAIN-ORIENTED ELECTRICAL STEEL SHEET, GRAIN-ORIENTED ELECTRICAL STEEL SHEET, AND METHOD FOR PRODUCING GRAIN-ORIENTED ELECTRICAL STEEL SHEET

CROSS-REFERENCE OF RELATED APPLICATIONS

This application is the U.S. National Phase under 35 U.S.C. § 371 of International Patent Application No. PCT/KR2017/015205, filed on Dec. 21, 2017, which in turn claims the benefit of Korean Application No. 10-2016-0177070, filed on Dec. 22, 2016, the entire disclosures of which applications are incorporated by reference herein.

BACKGROUND OF THE INVENTION

(a) Field of the Invention

The present invention relates to an annealing separator composition for a grain-oriented electrical steel sheet, a grain-oriented electrical steel sheet, and a method for manufacturing thereof.

Generally, a grain-oriented electrical steel sheet refers to an electrical steel sheet containing a Si component in a steel sheet, and having a structure of a crystalline orientation aligned in the {110}<001> directions, and having excellent magnetic properties in the rolling direction.

In case of generally known grain-oriented electrical steel sheet, iron loss is being improved and the noise decreasing effect caused by magnetostriction is being attempted by forming an insulation coating is formed on a Forsterite ($Mg_2SiO_4$) base background coating and using the difference in thermal expansion coefficient of this insulation coating to apply a tensile stress to the steel sheet, but there is a limit to satisfy the property level in the advanced grain-oriented electrical steel sheet which is recently required.

There has been proposed a method of improving the surface properties of $TiO_2$ and MgO in the step of applying an antifouling agent containing MgO as a main component in order to improve the properties of the forsterite coating in the conventional grain-oriented electrical steel sheet manufacturing process.

Further, in order to improve the coating tension more than the conventional forsterite, a method of forming a composite coating constitutes mullite and silica on the steel sheet by applying kaolinite ($Al_4Si_4O_{10}(OH)_8$) as an annealing separator to the surface of the decarburized annealed sheet to perform finish annealing, has been proposed. However, this method is a forming technology of the dual structure composite coating in which kaolinite is decomposed and the upper part is composed of mullite and the lower part is composed of silica so that it is difficult to control in a high temperature annealing process and it is difficult to form a uniform quality, and due to silica coating formed at the lower part, there is a problem that the adhesion is inferior.

Further, a method of removing the forsterite coating by applying alumina powder or a mixture of colloidal silica and MgCl2 as an anti-sticking agent is known as a method for improving the iron loss of the grain-oriented electrical steel sheet. However, such a method above has a problem that the iron loss of the electrical steel sheet is rather inferior due to the removal of the forsterite coating, and there is a problem that it is difficult to form an insulation coating in a subsequent process.

Contents of the Invention

Problem to Solve

The present invention provides an annealing separator composition for a grain-oriented electrical steel sheet, a grain-oriented electrical steel sheet, and a method for manufacturing thereof. Specifically, the present invention provides an annealing separator composition for a grain-oriented electrical steel sheet, a grain-oriented electrical steel sheet, and a method for manufacturing thereof, which is excellent in adhesion and coating tension so that it is improving iron loss of a material.

SUMMARY OF THE INVENTION

According to an embodiment of the present invention, an annealing separator composition for a grain-oriented electrical steel sheet comprises: on the basis of total solid 100 wt %, 5 to 70 wt % of mullite; and the remainder being magnesium oxide or magnesium hydroxide.

It may further comprise 0.1 to 20 wt % of metal hydroxide.

The metal hydroxide may comprise at least one selected from $Ni(OH)_2$, $Co(OH)_2$, $Cu(OH)_2$, $Sr(OH)_2$, $Ba(OH)_2$, $Pd(OH)_2$, $In(OH)_3$, $Bi(OH)_3$ and $Sn(OH)_2$.

It may further comprise 0.5 to 10 wt % of ceramic powder.

the ceramic powder may comprise at least one selected from MnO, $Al_2O_3$, $SiO_2$, $TiO_2$ and $ZrO_2$.

It may further comprise 1 to 10 wt % of $Sb_2(SO_4)_3$, $SrSO_4$, $BaSO_4$ or a combination thereof.

According to an embodiment of the present invention, a grain-oriented electrical steel sheet wherein a coating comprising mullite and forsterite is formed on one or both sides of a substrate of a grain-oriented electrical steel sheet.

The coating may comprise 0.5 to 50 wt % of Al.

The coating may further comprise 3 to 80 wt % of Mg, 3 to 80 wt % of Si, 3 to 80 wt % of 0 and Fe as the remainder.

A thickness of the coating may be 0.1 to 10 μm.

It may further comprise a ceramic layer formed on the coating.

The ceramic layer may comprise ceramic powder.

The ceramic powder may comprise at least one selected from $Al_2O_3$, $SiO_2$, $TiO_2$, $ZrO_2$, $Al_2O_3 \cdot TiO_2$, $Y_2O_3$, $9Al_2O_3 \cdot 2B_2O_3$, BN, CrN, $BaTiO_3$, SiC and TiC.

The ceramic layer may further comprise a metal phosphate.

The metal phosphate may comprise at least one selected from Mg, Ca, Ba, Sr, Zn, Al and Mn.

The substrate of a grain-oriented electrical steel sheet may comprise silicon (Si): 2.8 to 4.5 wt %, aluminium (Al): 0.020 to 0.040 wt %, manganese (Mn): 0.01 to 0.20 wt % and 0.01 to 0.15 wt % of antimony (Sb), tin (Sn), nickel (Ni) or a combination thereof, and the remainder may comprise Fe and other inevitable impurities.

According to an embodiment of the present invention, a method for manufacturing a grain-oriented electrical steel sheet comprises: preparing a steel slab; heating the steel slab; hot rolling the heated steel slab to produce a hot rolled sheet; cold rolling the hot rolled sheet to produce a cold rolled sheet; primary recrystallization annealing the cold rolled sheet; applying an annealing separator to the surface of the primary recrystallization annealed steel sheet; and secondary recrystallization annealing the steel sheet applied with the annealing separator thereto.

Wherein the annealing separator comprises: on the basis of total solid 100 wt %, 5 to 70 wt % of mullite; and the remainder being magnesium oxide or magnesium hydroxide.

It may further comprise forming a ceramic layer on the coating comprising mullite and forsterite, after the step of secondary recrystallization annealing.

The step of forming a ceramic layer may be a step of spraying ceramic powder on the coating to form a ceramic layer.

The step of forming a ceramic layer may be a step of applying a composition for forming a ceramic layer comprising ceramic powder and a metal phosphate to the coating to form a ceramic layer.

The step of primary recrystallization annealing the cold rolled sheet may comprise a step of simultaneously decarburized annealing and nitriding annealing the cold rolled sheet or comprises a step of nitriding annealing after decarburized annealing.

Effect of the Invention

According to one embodiment of the present invention, a grain-oriented electrical steel sheet having excellent iron loss and flux density and excellent adhesion and insulation property of a coating, and a method for manufacturing thereof may be provided.

BRIEF DESCRIPTION OF THE DRAWINGS

FIG. 1 is a schematic side cross-sectional view of a grain-oriented electrical steel sheet according to an embodiment of the present invention.

FIG. 2 is a flowchart of a method for manufacturing a grain-oriented electrical steel sheet according to an embodiment of the present invention.

FIG. 3 is a scanning electron microscope (SEM) photograph of the coating of the grain-oriented electrical steel sheet manufactured in Example 9.

FIG. 4 is a X-ray diffraction (XRD) result of the coating of the grain-oriented electrical steel sheet manufactured in Example 9.

FIG. 5 is a scanning electron microscope (SEM) photograph of the coating of the grain-oriented electric steel sheet manufactured in Comparative Example 2.

DETAILED DESCRIPTION OF THE EMBODIMENTS

The first term, second and third term, etc. are used to describe various parts, components, regions, layers and/or sections, but are not limited thereto. These terms are only used to distinguish any part, component, region, layer or section from other part, component, region, layer or section. Therefore, the first part, component, region, layer or section may be referred to as the second part, component, region, layer or section within the scope unless excluded from the scope of the present invention.

The terminology used herein is only to refer specific embodiments and is not intended to be limiting of the invention. The singular forms used herein comprise plural forms as well unless the phrases clearly indicate the opposite meaning. The meaning of the term "comprise" is to specify a particular feature, region, integer, step, operation, element and/or component, not to exclude presence or addition of other features, regions, integers, steps, operations, elements and/or components.

It will be understood that when an element such as a layer, coating, region, or substrate is referred to as being "on" another element, it can be directly on the other element or intervening elements may also be present. In contrast, when an element is referred to as being "directly on" another element, there are no intervening elements present.

In the present invention, 1 ppm means 0.0001%.

In an embodiment of the present invention, the meaning further comprising additional components means that the remainder is replaced by additional amounts of the additional components.

Although not defined differently, every term comprising technical and scientific terms used herein have the same meaning as commonly understood by those who is having ordinary knowledge of the technical field to which the present invention belongs. The commonly used predefined terms are further interpreted as having meanings consistent with the relevant technology literature and the present content and are not interpreted as ideal or very formal meanings unless otherwise defined.

Hereinafter, embodiments of the present invention will be described in detail so that those skilled in the art may easily carry out the present invention. The present invention may, however, be implemented in several different forms and is not limited to the embodiments described herein.

An annealing separator composition for a grain-oriented electrical steel sheet according to an embodiment of the present invention, comprises: on the basis of the solid, 5 to 70 wt % of mullite; and the remainder being magnesium oxide or magnesium hydroxide. Here, the "on the basis of the solid" means that the solid content excluding the components such as solvent is set to 100 wt %.

Hereinafter, the annealing separator composition according to an embodiment of the present invention will be described in detail for each component.

The annealing separator composition according to an embodiment of the present invention is applied to a substrate of a grain-oriented electrical steel sheet 10 to form a coating 20 comprising mullite and forsterite.

Mullite is the only compound that exists stably between silica and alumina and has a composition of $3Al_2O_3 \cdot 2SiO_2$. Mullite has a small thermal expansion coefficient ($5 \times 10^{-6}/°C$), which makes it easy to improve iron loss by imparting a film tension. In addition, mullite has a relatively low modulus of elasticity, and therefore has excellent thermal shock resistance.

The forsterite ($Mg_2SiO_4$) coating which is existing primary coating, is formed by the chemical reaction between the internal oxide layer ($SiO_2$) existing in the coil and magnesium oxide (MgO) in the annealing separator at the high temperature annealing. Conventional forsterite coatings have an excellent function to prevent sheet adhesion due to contact between coils during a high temperature annealing process, but there is a limit that the capacity of imparting the coating tension and insulating properties are inferior.

In one embodiment of the present invention, by adding mullite in addition to magnesium oxide or magnesium hydroxide, it may dramatically improve the capacity of imparting the coating tension and the insulating properties. However, when only mullite is used alone as the annealing separator, there is a problem that the difference in thermal expansion coefficient is extremely large during the secondary recrystallization annealing process so that coating is peeled off. In addition, the mullite component has a high specific gravity when it is used as an annealing separator and has a problem that it is not dispersed in a solvent and sinks, so that it may be difficult to uniformly be applied to the surface of an electrical steel sheet. In one embodiment of the present invention, mullite is not used alone, but is used in mixed with magnesium oxide or magnesium hydroxide.

In case kaolinite ($Al_4Si_4O_{10}(OH)_8$) is included as the annealing separator, it is difficult to control in the secondary recrystallization annealing step so that it is difficult to form a uniform quality, there is a problem that the adhesion is inferior due to silica coating formed at the lower part due to the decomposition of kaolinite.

In one embodiment of the present invention, the annealing separator composition comprises 5 to 70 wt % of mullite on the basis of solid. When mullite is comprised in a small amount, improvement of the capacity of imparting the coating tension and insulation properties may not be sufficient. When too much mullite is comprised, there may be a problem in uniformly applying the annealing separator. Therefore, mullite may be comprised in the ranges described above.

The metal hydroxide acts to change the surface property from hydrophobic to hydrophilic by chemical reaction with the surface of mullite. Thus, it dramatically improves the dispersibility of mullite and helps to form a uniform forsterite coating. In addition, the melting point of the metal hydroxide decreases so that the coating forming temperature is lowered in the secondary recrystallization annealing process, and surface properties of good quality may be obtained. Further, the forsterite coating produced in the low temperature region has an effect of inhibiting the decomposition of the AlN-base inhibitor, which has a decisive influence on the formation of the secondary recrystallization, and may obtain excellent magnetic quality.

In one embodiment of the present invention, the annealing separator composition may further comprise a metal hydroxide of 0.1 to 20 wt %. When the metal hydroxide is comprised in too small amount, there may be a problem in sufficiently exhibiting the above-mentioned effect. When too much metal hydroxide is comprised, since the metal component diffuses into the inside to form a coating, a problem that the forsterite formation behavior becomes non-uniform may occur.

At this time, the metal hydroxide means a metal hydroxide excluding the above-mentioned magnesium hydroxide. Specifically, the metal hydroxide may comprise at least one selected from $Ni(OH)_2$, $Co(OH)_2$, $Cu(OH)_2$, $Sr(OH)_2$, $Ba(OH)_2$, $Pd(OH)_2$, $In(OH)_3$, $Bi(OH)_3$ and $Sn(OH)_2$.

Magnesium oxide (MgO) or magnesium hydroxide ($Mg(OH)_2$) act to supply Mg to the coating. In one embodiment of the present invention, the annealing separator composition may be present in the form of a slurry to easily apply to the surface of the substrate of a grain-oriented electrical steel sheet. When the slurry comprises water as a solvent, the magnesium oxide may be easily soluble in water and may be present in the form of magnesium hydroxide. Therefore, in one embodiment of the present invention, magnesium oxide and magnesium hydroxide are treated as one component.

The annealing separator composition according to one embodiment of the present invention may further comprise 0.5 to 10 wt % of ceramic powder. The ceramic powder may comprise at least one selected from MnO, $Al_2O_3$, $SiO_2$, $TiO_2$ and $ZrO_2$. When the ceramic powder is further comprised in an appropriate amount, the insulating property of the formed coating 20 may be more improved.

The annealing separator composition according to one embodiment of the present invention may further comprise 1 to 10 wt % of $Sb_2(SO_4)_3$, $SrSO_4$, $BaSO_4$ or a combination thereof. By further comprising $Sb_2(SO_4)_3$, $SrSO_4$, $BaSO_4$, or a combination thereof in an appropriate amount, a grain-oriented electrical steel sheet of which surface gloss is excellent and of which the roughness is elegant may be produced.

The annealing separator composition may further comprise a solvent for even dispersion and easy application of the solids. As the solvent, water, alcohol and the like may be used, and 300 to 1000 parts by weight may be comprised with respect to 100 parts by weight of the solid. As such, the annealing separator composition may be in the form of a slurry.

A grain-oriented electrical steel sheet 100 according to an embodiment of the present invention, wherein a coating 20 comprising mullite and forsterite is formed on one or both sides of a substrate of a grain-oriented electrical steel sheet 10. FIG. 1 shows a schematic side cross-sectional view of a grain-oriented electrical steel sheet according to an embodiment of the present invention. FIG. 1 shows a case where a coating 20 is formed on the upper surface of a substrate of a grain-oriented electrical steel sheet 10.

The film 20 comprising mullite and forsterite has excellent capacity of imparting the coating tension and insulation property compared to the conventional forsterite coating, and the melting point decreases so that the coating 20 forming temperature is lowered in the secondary recrystallization annealing process, and surface properties of good quality may be obtained. Further, the coating 20 produced in the low temperature region has an effect of inhibiting the decomposition of the AlN-base inhibitor, which has a decisive influence on the formation of the secondary recrystallization, and may obtain excellent magnetic quality. Since this has been described above, redundant description will be omitted.

The coating 20 may further comprise an Al—Mg—Si composite in addition to mullite and forsterite.

The coating 20 may comprise 0.5 to 50 wt % of Al. When the Al content in the coating 20 is too small, the iron loss of the grain-oriented electrical steel sheet may be inferior. When the Al content in the coating 20 is too high, the corrosion resistance may be inferior. Therefore, Al may be comprised in the ranges described above. Al may be derived from the annealing separator composition and the substrate of a grain-oriented electrical steel sheet described above.

The coating 20 may further comprise 3 to 80 wt % of Mg, 3 to 80 wt % of Si, 3 to 80 wt % of O and Fe as the remainder. The Mg, Si and Fe element compositions are derived from the components in the substrate and the annealing separator component. In the case of O, it may be derived from the annealing separator component or may be input in the heat treatment process. And other impurity components such as carbon (C) may be further comprised.

A thickness of the coating may be 0.1 to 10 μm. When the thickness of the coating 20 is too small, the capacity of imparting the coating tension may be decreased, so that a problem that the iron loss is inferior may occur. When the thickness of the coating 20 is too large, the transformer space factor may be decreased so that a problem that transformer properties are inferior may occur. Therefore, the thickness of the forsterite coating 20 may be adjusted in the ranges described above. More specifically, the thickness of the forsterite coating 20 may be 0.8 to 6 μm.

In a grain-oriented electrical steel sheet 100 according to one embodiment of the present invention, a ceramic layer 30 may be further formed on the coating 20. FIG. 1 shows an example in which a ceramic layer 30 is further formed on the forsterite coating 20.

A thickness of the ceramic layer 30 may be 0.5 to 5 μm. When the thickness of the ceramic layer 30 is too small, a problem that the insulation effect of the ceramic layer is small may occur. When the thickness of the ceramic layer 30 is too large, the adhesion of the ceramic layer 30 becomes low, and peeling may occur. Therefore, the thickness of the ceramic layer 30 may be adjusted in the ranges described above. More specifically, the thickness of the ceramic layer 30 may be 0.8 to 3.2 μm.

The ceramic layer 30 may comprise ceramic powder. The ceramic powder may be at least one selected from $Al_2O_3$, $SiO_2$, $TiO_2$, $ZrO_2$, $Al_2O_3 \cdot TiO_2$, $Y_2O_3$, $9Al_2O_3 \cdot 2B_2O_3$, BN, CrN, $BaTiO_3$, SiC and TiC. The particle diameter of the ceramic powder may be 2 to 900 nm. When the particle diameter of the ceramic powder is too small, the formation of the ceramic layer may be difficult. When the particle diameter of the ceramic powder is too large, the surface roughness may become coarse and surface defects may occur. Therefore, the particle diameter of the ceramic powder may be adjusted in the ranges described above.

The ceramic powder may be in the form of any one or more selected from the group consisting of spherical, plate-like, and needle-shaped.

The ceramic layer 30 may further comprise a metal phosphate. The metal phosphate may comprise at least one selected from Mg, Ca, Ba, Sr, Zn, Al and Mn. When the metal phosphate is further comprised, the insulation property of the ceramic layer 30 is further improved.

The metal phosphate may be composed of a compound by chemical reaction of metal hydroxide and phosphoric acid ($H_3PO_4$).

The metal phosphate may be composed of a compound by chemical reaction of metal hydroxide and phosphoric acid ($H_3PO_4$), and the metal hydroxide may be at least one selected from the group consisting of $Ca(OH)_2$, $Al(OH)_3$, $Mg(OH)_2$, $B(OH)_3$, $Co(OH)_2$ and $Cr(OH)_3$.

Specifically, the metal atom of the metal hydroxide may be a compound which is composed by forming a single bond, a double bond, or a triple bond by a substitution reaction with phosphorous of phosphoric acid, and has the amount of unreacted free phosphoric acid ($H_3PO_4$) is 25 wt % or less.

The metal phosphate may be composed of a compound by chemical reaction of metal hydroxide and phosphoric acid ($H_3PO_4$), and the weight ratio of metal hydroxide to phosphoric acid may be expressed by 1:100 to 40:100.

When the metal hydroxide is comprised in too large amount, the chemical reaction may not be completed and the problem that the precipitate is produced may occur, and when the metal hydroxide is comprised in too small amount, the problem that corrosion resistance in inferior may occur so that the range may be limited as described above.

In one embodiment of the present invention, the effects of the annealing separator composition and coating 20 are exhibited regardless of the component of the substrate of a grain-oriented electrical steel sheet 10. Complementally, the components of the substrate of a grain-oriented electrical steel sheet 10 will be described as follows.

The substrate of a grain-oriented electrical steel sheet 10 may comprise silicon (Si): 2.8 to 4.5 wt %, aluminium (Al): 0.020 to 0.040 wt %, manganese (Mn): 0.01 to 0.20 wt % and 0.01 to 0.15 wt % of antimony (Sb), tin (Sn), nickel (Ni) or a combination thereof, and the remainder may comprise Fe and other inevitable impurities.

The reason for limiting the components of the substrate of a grain-oriented electrical steel sheet 10 will be described below.

Si: 2.8 to 4.5 wt %

Silicon (Si) plays a role of increasing the specific resistivity of the steel to reduce the iron loss, but when the content of Si is too small, the specific resistivity of the steel is small to deteriorate the property of iron loss, and a phase transformation section during high temperature annealing is presented so that a problem that the secondary recrystallization is unstable may occur. When the content of Si is too large, brittleness is increased, thus a problem hindering cold rolling may occur. Therefore, Si content may be adjusted in the ranges described above. More specifically, Si may be comprised 3.0 to 4.0 wt %.

Al: 0.020 to 0.040 wt %

Aluminum (Al) is an element that has a final form of nitride such as AlN, (Al, Si)N, (Al, Si, Mn)N and that acts as a suppressor. When the Al content is too small, sufficient effect as a suppressor may not be expected. When the Al content is too high, too coarse nitride of the Al system will precipitate and grow, resulting in insufficient suppressing effect. Therefore, Al content may be adjusted in the ranges described above.

Mn: 0.01 to 0.20 wt %

Likewise Si, Mn has the effect of reducing the iron loss by increasing the specific resistivity and it acts as an important element for the secondary recrystallization since Mn, along with Si, forms the precipitates (Al, Si, Mn)N by reacting with nitrogen introduced by the nitriding treatment, thus suppressing the growth of primary recrystallization and causing secondary recrystallization. However, when Mn content is too high, this will promote the austenite phase transformation during hot rolling, which reduces the size of primary recrystallization and resulting in unstable secondary recrystallization. Further, when Mn content is too small, an effect that the primary recrystallization is kept from being unnecessarily increased in size during re-precipitation through precipitate refinement and MnS formation by increasing the austenite fraction during hot-rolling reheating to increase the solid solution amount of the precipitates, may insufficiently occur. Therefore, Mn content may be adjusted in the ranges described above.

Sb, Sn, Ni or a combination thereof: 0.01 to 0.15 wt %

Antimony (Sb), Tin (Sn) and Nickel (Ni) is a grain boundary segregation element and is an element that interferes with the migration of the grain boundaries, is an important element for controlling grain size since it acts as a grain growth inhibitor to promote generation of the Goss grains in the {110}<001> orientation and aids in the efficient development of the secondary recrystallization. If the content of Sb, Sn or Ni alone or in combination is too small, the effect is deteriorated if the content of Sb, Sn or Ni alone or in combination is too high, the grain boundary segregation occurs severely, which will increase the brittleness of the steel sheet and result in the sheet fracture during rolling.

More specifically, it may comprise 0.01 to 0.05 wt % of Sb, 0.01 to 0.12 wt % of Sn and 0.01 to 0.06 wt % of Ni.

C: 0.01 wt % or less

In an embodiment of the present invention, C is a component that does not greatly contribute to the improvement of the magnetic properties of the grain-oriented electrical steel sheet, so it is desirable to remove it as much as possible. However, the presence of more than a certain level of C during the rolling process promotes the austenite transformation of the steel, thereby refining the hot rolling structure and assisting formation of a uniform microstructure during hot rolling. Therefore, C content in the slab is preferably comprised 0.03 wt % or more. However, the presence of excessive C content may cause production of coarse carbide which is difficult to remove during decarburization. Accordingly, it is preferable to be limited to 0.08 wt % or less. Carbon is decarburized through the decarburized annealing process in the process of manufacturing the grain-oriented electrical steel sheet, and 0.01 wt % or less of C is comprised in the grain-oriented electrical steel sheet to be manufactured at a final.

N: 0.005 to 0.05 wt %

N is an element that reacts with Al and refines the grains. When these elements are appropriately distributed, it may be helpful to ensure adequate primary recrystallized grain size after cold rolling by appropriately refining the structure as described above. However, excessive contents of these elements will result in excessively refined primary recrystallization grains, in which case the fine grains increases the driving force of causing the grain growth during the secondary recrystallization, resulting in the growth of even the grains of undesirable orientation. Further, when there is an excessive content of N included, removal of the N content itself takes a long time in the final annealing process, which is not preferable. Accordingly, since the upper limit of the nitrogen content in the slab is set to 0.005 wt %, but the content of nitrogen to be solved during reheating of the slab needs to be 0.001 wt % or more, it is preferable that the lower limit of the nitrogen content in the slab is set to 0.001 wt %. Nitrogen is partially penetrated through the deposition annealing process in the manufacturing process of the grain-oriented electrical steel sheet, and 0.005 to 0.05 wt % of N is comprised in the grain-oriented electrical steel sheet to be manufactured at a final.

FIG. 2 shows a schematic flowchart of a method for manufacturing a grain-oriented electrical steel sheet according to an embodiment of the present invention. The flowchart of the method for manufacturing a grain-oriented electrical steel sheet of FIG. 2 is for illustrating the present invention only, and the present invention is not limited thereto. Therefore, the method for manufacturing the grain-oriented electrical steel sheet may be variously modified.

As shown in FIG. 2, a method for manufacturing a grain-oriented electrical steel sheet comprises: preparing a steel slab (S10); heating the steel slab (S20); hot rolling the heated steel slab to produce a hot rolled sheet (S30); cold rolling the hot rolled sheet to produce a cold rolled sheet (S40); primary recrystallization annealing the cold rolled sheet (S50); applying an annealing separator to the surface of the primary recrystallization annealed steel sheet (S60); and secondary recrystallization annealing the steel sheet applied with the annealing separator thereto (S70). In addition, the method for manufacturing the grain-oriented electrical steel sheet may further comprise other steps.

First, in step S10, a steel slab is prepared. Since the components of the steel slab are described in detail with respect to the components of the grain-oriented electrical steel sheet described above, repeated description is omitted.

Next, in step S20, the steel slab is heated. At this time, the slab heating may be performed by the low-temperature slab method at 1,200° C. or less.

Next, in step S30, the heated steel slab is hot rolled to produce a hot rolled sheet. After step S30, the produced hot rolled sheet may be hot rolled annealed.

Next, in step S40, the hot rolled sheet is cold rolled to produce a cold rolled sheet. In step S40, cold rolling may be performed once, or cold rolling comprising intermediate annealing may be performed twice or more.

Next, in the step S50, the cold rolled sheet is primary recrystallization annealed. At this time, the step of primary recrystallization annealing the cold rolled sheet may comprise a step of simultaneously decarburized annealing and nitriding annealing the cold rolled sheet or comprises a step of nitriding annealing after decarburized annealing.

Next, in step S60, the annealing separator is applied to the surface of the primary recrystallization annealed steel sheet. Since the annealing separator has been described above in detail, repeated description is omitted.

The application amount of the annealing separator may be 1 to 20 g/m$^2$. When the application amount of the annealing separator is too small, the coating formation may not be smoothly performed. If the application amount of the annealing separator is too large, it may affect the secondary recrystallization. Therefore, the application amount of the annealing separator may be adjusted in the ranges described above.

Next, in step S70, the steel sheet applied with the annealing separator thereto is secondary recrystallization annealed. During the process of secondary recrystallization annealing, the coating 20 comprising mullite and forsterite is formed.

The primary cracking temperature may be 650 to 750° C. and the secondary cracking temperature may be 1100 to 1250° C. during the secondary recrystallization annealing. And it may be controlled at a condition of 15° C./hr in the temperature section of the temperature rising section. Further, it may be performed in the gas atmosphere which is an atmosphere comprising 220 to 30 vol % of nitrogen and 70 to 80 vol % of hydrogen until the first cracking step, it may be subjected to furnace cooling after being maintained in a 100% hydrogen atmosphere for 15 hours in the second cracking step. The coating 20 may be smoothly formed through the above-described conditions.

It may further comprise forming a ceramic layer 30 after step S70. Since the ceramic layer 30 has been described above in detail, repeated description is omitted. As the method of forming a ceramic layer 30, ceramic powder may be sprayed on the coating 20 to form a ceramic layer. Specifically, the method such as plasma spray coating, high velocity oxy fuel coating, aerosol deposition coating, or cold spray coating may be applied. More specifically, a plasma spray coating method may be used in which ceramic powder is supplied to a heat source in which a gas comprising Ar, H$_2$, N$_2$, or He is plasma-generated at an output of 20 to 300 kW to form a ceramic layer. Further, as a plasma spray coating method, a gas comprising Ar, H$_2$, N$_2$, or He may be supplied in a suspension form of a mixture of a ceramic powder and a solvent to a heat source which is plasma-generated at an output of 20 to 300 kW to form a ceramic layer 30. At this time, the solvent may be water or alcohol.

As a method for forming the ceramic layer 30, a method of applying a composition for forming a ceramic layer comprising ceramic powder and a metal phosphate to the coating to form a ceramic layer may be used.

After formation of the ceramic layer 30, refining the magnetic domains may be performed as required.

Hereinafter, the present invention will be described in more detail with reference to examples. However, these examples are only for illustrating the present invention, and the present invention is not limited thereto.

Experimental Example 1

Properties of Annealing Separator Component and Ceramic Layer Type

Example 1

A slab comprising Silicon (Si): 3.4 wt %, Aluminum (Al): 0.03 wt %, Manganese (Mn): 0.05 wt %, Antimony (Sb): 0.04 wt %, Tin (Sn): 0.09 wt %, Nickel (Ni): 0.02 wt %, Carbon (C): 0.06 wt %, and Nitrogen (N): 40 ppm by weight, and the remainder consisting of Fe and other inevitable impurities was prepared.

The slab was heated at 1150° C. for 220 minutes and then hot-rolled to a thickness of 2.3 mm to prepare a hot rolled sheet.

The hot rolled sheet was heated to 1120° C., maintained at 920° C. for 95 seconds, and then quenched in water and pickled, followed by cold rolling to a thickness of 0.23 mm to prepare a cold rolled sheet.

The cold rolled sheet was placed in a furnace, and then maintained for 180 seconds in a mixed atmosphere of 74 vol % of hydrogen, 25 vol % of nitrogen and 1 vol % of dry ammonia gas, and being subjected decarburization deposition and primary recrystallization annealing were simultaneously performed to prepare the primary recrystallization annealed steel sheet.

As the annealing separator composition, 30 wt % of mullite, 3 wt % of cobalt hydroxide, 5 wt % of titanium oxide, 5 wt % of $Sb_2(SO_4)_3$ and the remainder magnesium oxide (MgO) were mixed with distilled water to prepare in a form of slurry, and the slurry was applied to the primary recrystallization annealed steel sheet using a roll, and subjected to the secondary annealing.

The primary cracking temperature was 700° C. during the secondary recrystallization annealing, the secondary cracking temperature was 1200° C., and the rate of temperature rising was set to 15° C./hr at the temperature rising section. Further, the mixed gas atmosphere of 50 vol % of nitrogen and 50 vol % of hydrogen was heated up to 1200° C., and after reaching 1200° C., kept in a 100 vol % hydrogen gas atmosphere for 20 hours and then furnace cooled.

Thereafter, $TiO_2$ was supplied as a ceramic powder to a heat source in which argon (Ar) gas was converted into plasma at an output of 250 kW to form a ceramic layer having a thickness of 0.9 μm on the surface of the final annealed sheet.

Example 2 to Example 8

Performing in the same manner as the Example 1, except that the mullite and metal hydroxide components in the annealing separator were changed as shown in Table 1 to form a coating. The ceramic powders summarized in Table 1 below were applied to the surface of the forsterite coating.

Example 9

Performing in the same manner as the Example 1, except that no ceramic layer was formed.

Comparative Example 1

Performing in the same manner as the Example 1, except that an annealing separator composition comprising 90 wt % of magnesium oxide, 5 wt % of titanium oxide and 5 wt % of $Sb_2(SO_4)_3$ was used.

Comparative Example 2

Performing in the same manner as the Example 1, except that the annealing separator composition comprising 100 wt % of mullite was used.

Comparative Example 3

Performing in the same manner as the Example 1, except that an annealing separator composition comprising 90 wt % of mullite, 5 wt % of titanium oxide and 5 wt % of $Sb_2(SO_4)_3$ was used.

The grain-oriented electrical steel sheets manufactured in Examples and Comparative Examples were evaluated for magnetic properties and noise characteristics under the conditions of 1.7 T, 50 Hz, and the results are shown in Table 1 below.

The magnetic properties of the electrical steel sheet are usually $W_{17/50}$ and $B_8$. $W_{17/50}$ means the power loss (W/kg) when magnetizing a magnetic field of frequency 50 Hz up to 1.7 Tesla by AC. In this case, 'tesla' is the unit of flux density, which means the flux per unit area. B8 indicates a value the flux density (Tesla) flowing an electrical steel sheet when a current of 800 A/m was flowed through a winding wound around an electrical steel sheet.

Further for insulation property, the upper portion of the coating was measured according to the ASTM A717 international standard, using a Franklin measuring instrument.

Further, the adhesion is represented by the minimum arc diameter without peeling of the coating when the specimen is bent by 180° in contact with the arc of 10 to 100 mm.

Further, the surface properties are the result of forming a uniform film and visually evaluating the degree of uniformity of color.

TABLE 1

| Classification | Annealing separator component | | Type of ceramic layer | Iron loss ($W_{17/50}$, W/kg) | Flux density ($B_8$, T) | Insulation (mA) | Adhesion (mmφ) | Surface property |
| --- | --- | --- | --- | --- | --- | --- | --- | --- |
| | Mullite (wt %) | Metal hydroxide (wt %) | | | | | | |
| Comparative Example 1 | — | — | — | 0.981 | 1.910 | 982 | 30 | Uniform |

TABLE 1-continued

| Classification | Annealing separator component | | Type of ceramic layer | Iron loss ($W_{17/50}$, W/kg) | Flux density ($B_8$, T) | Insulation (mA) | Adhesion (mmφ) | Surface property |
|---|---|---|---|---|---|---|---|---|
| | Mullite (wt %) | Metal hydroxide (wt %) | | | | | | |
| Comparative Example 2 | 100 | — | — | 1.275 | 1.885 | — | 70 | Extreme surface peeling |
| Comparative Example 3 | 90 | — | — | 1.223 | 1.890 | — | 70 | Extreme surface peeling |
| Example 1 | 30 | Co (1.2) | $TiO_2$ | 0.690 | 1.925 | 35 | 20 | Uniform |
| Example 2 | 5 | Cu (20) | $Al_2O_3$ | 0.751 | 1.918 | 415 | 20 | Uniform |
| Example 3 | 15 | Sr (11) | $9Al_2O_3 \cdot 2B_2O_3$ | 0.735 | 1.915 | 330 | 15 | Uniform |
| Example 4 | 20 | Ba (0.1) | BN | 0.775 | 1.931 | 245 | 20 | Uniform |
| Example 5 | 30 | Pd (0.5) | SiC | 0.801 | 1.911 | 120 | 20 | Uniform |
| Example 6 | 50 | In (3.3) | $Al_2O_3$ | 0.650 | 1.942 | 130 | 15 | Uniform |
| Example 7 | 70 | Bi (2.7) | $Al_2O_3$ | 0.675 | 1.934 | 15 | 15 | Uniform |
| Example 8 | 45 | Sn (8.5) | $TiO_2$ | 0.664 | 1.928 | 32 | 25 | Uniform |
| Example 9 | 30 | Ni (1.5) | — | 0.820 | 1.920 | 610 | 20 | Uniform |

As shown in Table 1, it may be confirmed that the properties of Examples 1 to 9 are superior to those of Comparative Example 1 to Comparative Example 3. Also, in Comparative Example 2 in which mullite is used alone, peeling of the coating extremely occurred and it may be confirmed that the magnetic properties become inferior.

FIG. 3 shows a scanning electron microscope (SEM) photograph of the coating of the grain-oriented electrical steel sheet manufactured in Example 9. It may be confirmed that a coating is uniformly formed without defects. FIG. 4 shows a X-ray diffraction (XRD) result of the coating of the grain-oriented electrical steel sheet manufactured in Example 9. It may be confirmed that peaks corresponding to Al, Mg and Si are formed.

FIG. 5 shows a scanning electron microscope (SEM) photograph of the coating of the grain-oriented electric steel sheet manufactured in Comparative Example 2. It may be confirmed that a large number of cracks are formed, and as a result, surface peeling becomes severe.

Experimental Example 2

Evaluation of Magnetic Properties, Space Factor and Noise Characteristics of a 1000 kVA Transformer Example 10

A slab comprising Silicon (Si): 3.3 wt %, Aluminum (Al): 0.03 wt %, Antimony (Sb): 0.03 wt %, Tin (Sn): 0.05 wt %, Nickel (Ni): 0.02 wt %, Carbon (C): 0.05 wt %, and Nitrogen (N): 30 ppm by weight, and the remainder consisting of Fe and other inevitable impurities was prepared.

The slab was heated at 1150° C. for 220 minutes and then hot-rolled to a thickness of 2.3 mm to prepare a hot rolled sheet.

The hot rolled sheet was heated to 1120° C., maintained at 920° C. for 95 seconds, and then quenched in water and pickled, followed by cold rolling to a thickness of 0.23 mm to prepare a cold rolled sheet.

The cold rolled sheet was placed in a furnace, and then maintained for 180 seconds in a mixed atmosphere of 74 vol % of hydrogen, 25 vol % of nitrogen and 1 vol % of dry ammonia gas, and being subjected decarburization deposition and primary recrystallization annealing were simultaneously performed to prepare the primary recrystallization annealed steel sheet.

As the annealing separator composition, 18 wt % of mullite, 3.8 wt % of nickel hydroxide, 5 wt % of titanium oxide, 5 wt % of $Sb_2(SO_4)_3$ and the remainder magnesium oxide (MgO) were mixed with distilled water to prepare in a form of slurry, and the slurry was applied to the primary recrystallization annealed steel sheet using a roll, and subjected to the secondary annealing.

The primary cracking temperature was 700° C. during the secondary recrystallization annealing, the secondary cracking temperature was 1200° C., and the rate of temperature rising was set to 15° C./hr at the temperature rising section. Further, the mixed gas atmosphere of 50 vol % of nitrogen and 50 vol % of hydrogen was heated up to 1200° C., and after reaching 1200° C., kept in a 100 vol % hydrogen gas atmosphere for 20 hours and then furnace cooled.

Thereafter, a composition for forming a ceramic layer mixed with 45 wt % of colloidal silica, 45 wt % of aluminum phosphate, 5 wt % of chromium oxide and 5 wt % of nickel hydroxide was stirred, and applied on the surface of the final annealed sheet so as to be 4.5 g/m², and then treated for 120 seconds in a drying furnace set at 860° C., and then the laser refining the magnetic domains was performed, and then a 1000 kVA transformer was fabricated, and the results of evaluating in the condition of 60 Hz according to the design flux density were shown in Table 2.

Comparative Example 4

Performing in the same manner as the Example 10, except that an annealing separator composition comprising 90 wt % of magnesium oxide, 5 wt % of titanium oxide and 5 wt % of $Sb_2(SO_4)_3$ was used.

The space factor was measured according to JIS C2550 international standard, using a measuring instrument. A uniform pressure of 1 MPa was applied to the surface after laminating a plurality of electrical steel sheet specimens, and then the practical weight ratio by laminating of the electrical steel sheet was measured by dividing by the theoretical weight, through the precision measurement of the height of the four faces of the specimens.

The noise evaluation method was conducted in the same manner as the international standard IEC 61672-1, while the noise was evaluated by acquiring the shaking (vibration) data of the electrical steel sheet instead of the sound pressure and then converting it to the noise conversion value [dBA]. The vibration of an electrical steel sheet was obtained by measuring vibration pattern over time in a non-contact method using a laser Doppler method, while a magnetic field of frequency 60 Hz was magnetized to 1.7 tesla by AC.

TABLE 2

| Classification | Coating | Iron loss ($W_{17/50}$, W/kg) | Flux density ($B_8$, T) | Space factor (%) | Noise (dBA) |
|---|---|---|---|---|---|
| Example 10 | Containing mullite and forsterite | 0.680 | 1.932 | 97.2 | 49.5 |
| Comparative Example 4 | Forsterite | 0.842 | 1.908 | 96.2 | 55.5 |

As shown in Table 2, it may be confirmed that the properties of Example 10 are far superior to those of Comparative Example 4.

The present invention is not limited to the above-mentioned examples or embodiments and may be manufactured in various forms, those who have ordinary knowledge of the technical field to which the present invention belongs may understand that it may be carried out in different and concrete forms without changing the technical idea or fundamental feature of the present invention. Therefore, the above-mentioned examples or embodiments are illustrative in all aspects and not limitative.

[Explanation of symbols]

100: Grain-oriented electrical steel sheet
10: Substrate of a grain-oriented electrical steel sheet
20: Coating
30: Ceramic layer

What is claimed is:

1. An annealing separator composition for a grain-oriented electrical steel sheet comprising:
    on the basis of total solid 100 wt %, 5 to 70 wt % of mullite; and
    the remainder being magnesium oxide or magnesium hydroxide.

* * * * *